Aug. 21, 1934.   J. PARKHILL   1,970,765
BAND SPRING CLIP
Filed Nov. 7, 1931

Inventor
James Parkhill.
By Blackmore, Spencer & Flint
Attorneys

UNITED STATES PATENT OFFICE 1,970,765

BAND SPRING CLIP

James Parkhill, Flint, Mich., assignor to General Motors Corporation, Detroit, Mich., a corporation of Delaware Application November 7, 1931, Serial No. 573,565

3 Claims. (Cl. 267—53)

This invention relates to spring clips and has particular reference to a flat or band type of spring clip for application to the leaf springs of automotive vehicles.

In carrying out the invention a flat band is used which extends around three sides of the spring and part way over the fourth. The ends of the band are angularly bent to form flanges and a connecting member having cooperating flanges fits over the flanged ends of the band and the parts are then suitably squeezed together to form a rigid clip rigidly to hold the spring leaves together. The spring has openings at its lower side at the places where the clips are positioned and a projection on the connecting member fits into the opening to prevent the clip from slipping.

The spring clip of the invention is of particular value where a spring cover is used. In the spring clips of the prior art, the U-bolt and the connecting member beneath the spring have projected away from the spring a considerable distance so that considerable difficulties arose when it was desired to apply a spring cover. These projections caused by the older type of clip made necessary enlarged or projected portions on the spring cover to accommodate the clips. With the present invention, an ordinary flat tapered spring cover may be used and the necessary spring cover projections to accommodate the clips are eliminated.

Figure 1:
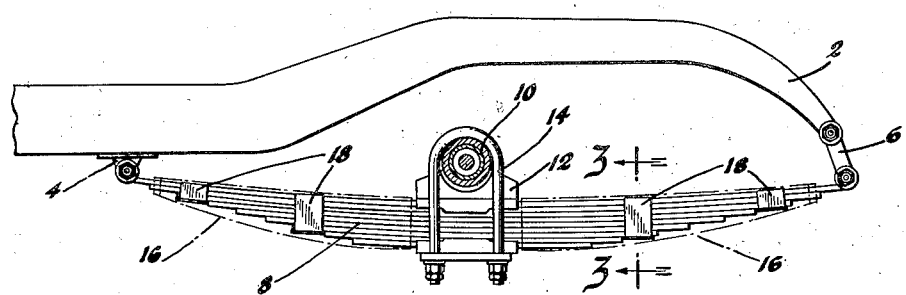
Figure 1 is a view of a portion of a chassis of an automotive vehicle showing the usual leaf spring and the clips applied, a spring cover being shown in dotted outline.

Referring to the drawing, the numeral 2 indicates the chassis of an automotive vehicle. The chassis has a spring bracket 4 at one end and the spring clip 6 at the other, to the ends of which the usual leaf spring 8 is pivotally secured. An axle housing is shown at 10 which is secured to the spring 8 by means of the usual saddle 12 and U-bolt 14. A spring cover is shown in dotted outline at 16. The parts so far described are conventional and per se form no part of the invention.

The novel spring clips of the invention are indicated at 18, two being shown at each side of the spring 8. The spring clip 18 comprises the band portion 20 which extends across the top of the spring as indicated at 22 along the sides as shown at 24 and part way across the bottom as indicated at 26. The ends of the band 20 are bent to form the angular flanges 28.

The clip also comprises the connector 30 which has the angular flanges 32 at its ends. These flanges are adapted to engage with the flanges 28 of the band 20 and when they are placed thereover and pressed together, they are rigidly interlocked, as indicated at 34 in Figures 3 and 4, rigidly to hold the clip on the spring. The flanges 32 are bent away from the main portion of the connector 30 as indicated by the bend at 36. The purpose of this bend is to allow the main portion of the connector to fit flatly against the spring as shown at 37 in Figure 3.

Figure 3:
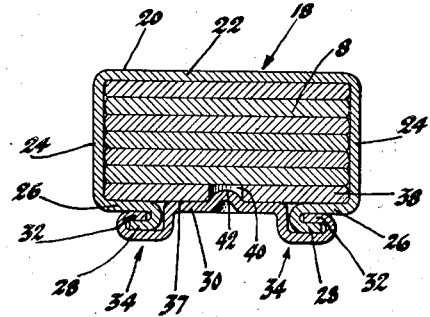
Figure 3 is a sectional view on the line 3—3 of Figure 1.

The bottom leaf 38 of the spring is provided with openings 40 and the central portion of each connector 30 is provided with a projection or knob 42 which fits into the openings and prevents the spring clip from slipping when rigidly secured in position as shown in Figure 3.

Figure 4:
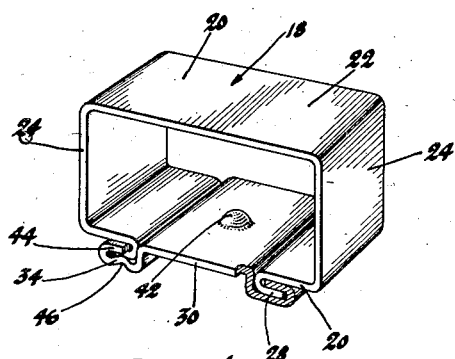
Figure 4 is a perspective view of the clip, a part being shown in section.

Referring to Figure 4, it will be noted that the ends 44 of the connector 30 extend slightly beyond the ends of the flanges 28. The purpose of this structure is to allow the extending portion 44 to be squeezed together, as indicated at 46, to form a more rigid connection and to prevent the slipping of the connector 30 relative to the band 18. Instead of the extension 44, the flanges 28 are made slightly shorter and the same function accomplished. It will, therefore, appear that the corners of the connector 30 are pinched in as shown at 46.

Figure 2:
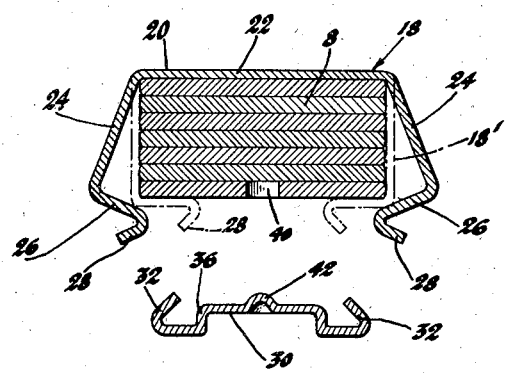
Figure 2 is an expanded view of the parts taken substantially on the line 3—3 of Figure 1.

Figure 2 shows the manner in which the spring clip is assembled. The band 20 before application is in the full line position. From the full line position, it is bent to the dotted line position 18′ and the connector 30 then slipped over the ends of flanges 28. The flanges 32 are open a sufficient distance to allow them to slip over the ends of flanges 28. The parts are now squeezed together in a suitable press or die to cause the flanges to interengage, as shown in Figure 3, and the extending ends 44 to be pinched together as shown at 46.

I claim:

1. In a spring clip, a flat band embracing three sides of the spring and extending part way on the farther side, and means interconnecting the ends of the band rigidly to hold the clip on the spring, said means being slightly broader than the band and having its corners pinched together.

2. In a spring clip, a flat band embracing three sides of the spring and having its two ends extending toward each other part way on the fourth side and having no projecting portion at the edges of the spring, said spring having an opening between the ends of the band, a flat connector flatwise engaging the underside of the spring and uniting the ends of the band rigidly to hold it on the spring, said connector being of less width than the width of the spring, and a projection on the connector extending into the opening to prevent slipping of the clip.

3. In a spring clip, a flat band extending part way around the spring and having no projections at the spring corners, angularly bent flanges on the ends of the band, said spring having an opening between the ends of the band, a flat connector flatwise engaging the spring and having a width less than the width of the spring, a projection on the connector extending into the opening to prevent slipping of the clip, and flanges on the connector engaging with the flanges on the band rigidly to hold the clip on the spring.

JAMES PARKHILL.